United States Patent [19]

Tsai

[11] Patent Number: 5,626,351

[45] Date of Patent: May 6, 1997

[54] COLLAPSIBLE HAND CART

[76] Inventor: Cheng-Hsien Tsai, 103, Da-Ming 1st Rd., Tien-Tzu Hsiang, Taichung Hsien, Taiwan

[21] Appl. No.: 491,588

[22] Filed: Jun. 16, 1995

[51] Int. Cl.$^6$ ............................................. B62B 1/04
[52] U.S. Cl. ..................... 280/40; 280/47.18; 280/655
[58] Field of Search ............................. 280/37, 38, 39, 280/40, 639, 641, 648, 651, 655, 87.05, 43.13, 47.131, 47.18, 47.24, 47.29, 47.315

[56] References Cited

U.S. PATENT DOCUMENTS

| | | | |
|---|---|---|---|
| 1,116,086 | 11/1914 | Lewis | 280/43.13 |
| 2,521,819 | 9/1950 | Baer | 280/47.131 |
| 4,431,211 | 2/1984 | Carrigan | 280/47.29 |
| 4,478,429 | 10/1984 | Adams | 280/47.315 |
| 4,540,196 | 9/1985 | Paping et al. | 280/639 |
| 4,917,392 | 4/1990 | Ambasz | 280/40 |
| 4,969,660 | 11/1990 | Spak | 280/655 |
| 5,348,325 | 9/1994 | Abrams | 280/47.29 |
| 5,468,005 | 11/1995 | Yang | 280/40 |

FOREIGN PATENT DOCUMENTS

| | | | |
|---|---|---|---|
| 730364 | 12/1942 | Germany | 280/38 |
| 1527076 | 12/1989 | U.S.S.R. | 280/47.131 |

Primary Examiner—Richard M. Camby
Assistant Examiner—Frank Vanaman
Attorney, Agent, or Firm—Bacon & Thomas

[57] ABSTRACT

A collapsible hand cart including a base frame unit, a telescopic handle pivoted to the base frame unit in the middle, two steering mechanisms mounted on the base frame unit at two opposite sides for moving the base frame unit by the telescopic handle, each steering mechanism including a wheel holder turned about a pivot on the base frame unit to hold a roller, a movable member turned about a pivot on the wheel holder, and a link having a pivot hole at one end connected to the movable member and the base frame unit by a pivot and an elongated sliding slot connected to a bolt on a slide, which slide is moved vertically in a longitudinal sliding slot on the telescopic handle, wherein when the hand cart is collapsed, the wheel holders and movable members and links of the steering mechanisms and the telescopic handle are received together in the X-axis direction; when the telescopic handle is lifted to the Z-axis direction and extended out, the links are lifted, causing the movable members to force the wheel holders toward the Y-axis direction.

4 Claims, 5 Drawing Sheets

COLLAPSIBLE HAND CART

BACKGROUND OF THE INVENTION

The present invention relates to hand carts, and relates more particularly to a collapsible hand cart which can be conveniently extended out or collapsed by moving the driving mechanism in the Z-axis direction to move the steering mechanisms between the X-axis direction and the Y-axis direction.

Regular hand carts are commonly of the fixed type comprised of a base frame supported on wheels, a carrier fixedly secured to the base frame for carrying things, and a handle fixedly secured to the base frame for moving it. Because these hand carts are not collapsible, they occupy much storage space when not in use. There is known a folding hand cart having a folding carrier which can be turned between the operative position and the non-operative (collapsed) position. Because the wheels and the handle are not collapsible, this structure of folding hand cart still needs much storage space when it is not used.

SUMMARY OF THE INVENTION

The present invention has been accomplished to provide a collapsible hand cart which the driving mechanism, the steering mechanisms, and the carrier frame can be simultaneously collapsed so that less storage space is needed when the hand cart is not used.

According to one aspect of the present invention, the collapsible hand cart comprises a base frame unit, a collapsible driving mechanism pivoted to the base frame unit in the middle, and two steering mechanisms mounted on the base frame unit at two opposite sides for moving the base frame unit by the driving mechanism, wherein each steering mechanism comprises a wheel holder turned about a pivot on the base frame unit, which wheel holder having a roller at one end for supporting and moving the base frame unit and extension bars at an opposite end; a movable member pivoted to the wheel holder, which movable member comprises an opening at one end, a wheel holder mounting hole connected to the wheel holder by a pivot about which the movable member is turned, a longitudinal oblong slot across the opening, and two parallel upright lugs at two opposite sides by the opening, each upright lug defining a transverse oblong slot; and a link having a bottom end inserted into the opening on the movable member and pivotably connected to the movable member, and, a top end coupled to the driving mechanism through a slip joint, the bottom end of the link having two vertically spaced pivot holes respectively coupled to the longitudinal oblong slot on the movable member and the transverse oblong slots on the upright lugs by a respective pivot, the top end of the link having an elongated sliding slot connected to a slide being moved vertically along a longitudinal sliding slot on the driving mechanism.

According to another aspect of the present invention, the driving mechanism comprises a telescopic handle consisting of an outer tube, an intermediate tube, and an inner tube, and a handgrip fixedly secured to the inner tube, wherein the outer tube is pivoted to the base frame unit and turned between the X-axis direction and the Z-axis direction and having a longitudinal sliding slot and a slide connected to the links of the steering mechanisms by a bolt and moved along the longitudinal sliding slot; the intermediate tube has a bottom end inserted into the outer tube and coupled to the slide, and a top end extended out of the outer tube; the inner tube has a bottom end inserted in the intermediate tube and secured in the intermediate tube for permitting the intermediate tube to be pulled out of the outer tub when said inner tube is pulled out of the intermediate tube, and a top end fixedly connected to the handgrip.

According to still another aspect of the present invention, the collapsible hand cart further comprises a U-frame having two pivoted arms respectively pivoted to the extension bars of the wheel holders to form a carrier frame for carrying things.

BRIEF DESCRIPTION OF THE DRAWINGS

The present invention will now be described by way of example with reference to the annexed drawings, in which.

DETAILED DESCRIPTION OF THE PREFERRED EMBODIMENT

Figure 1:
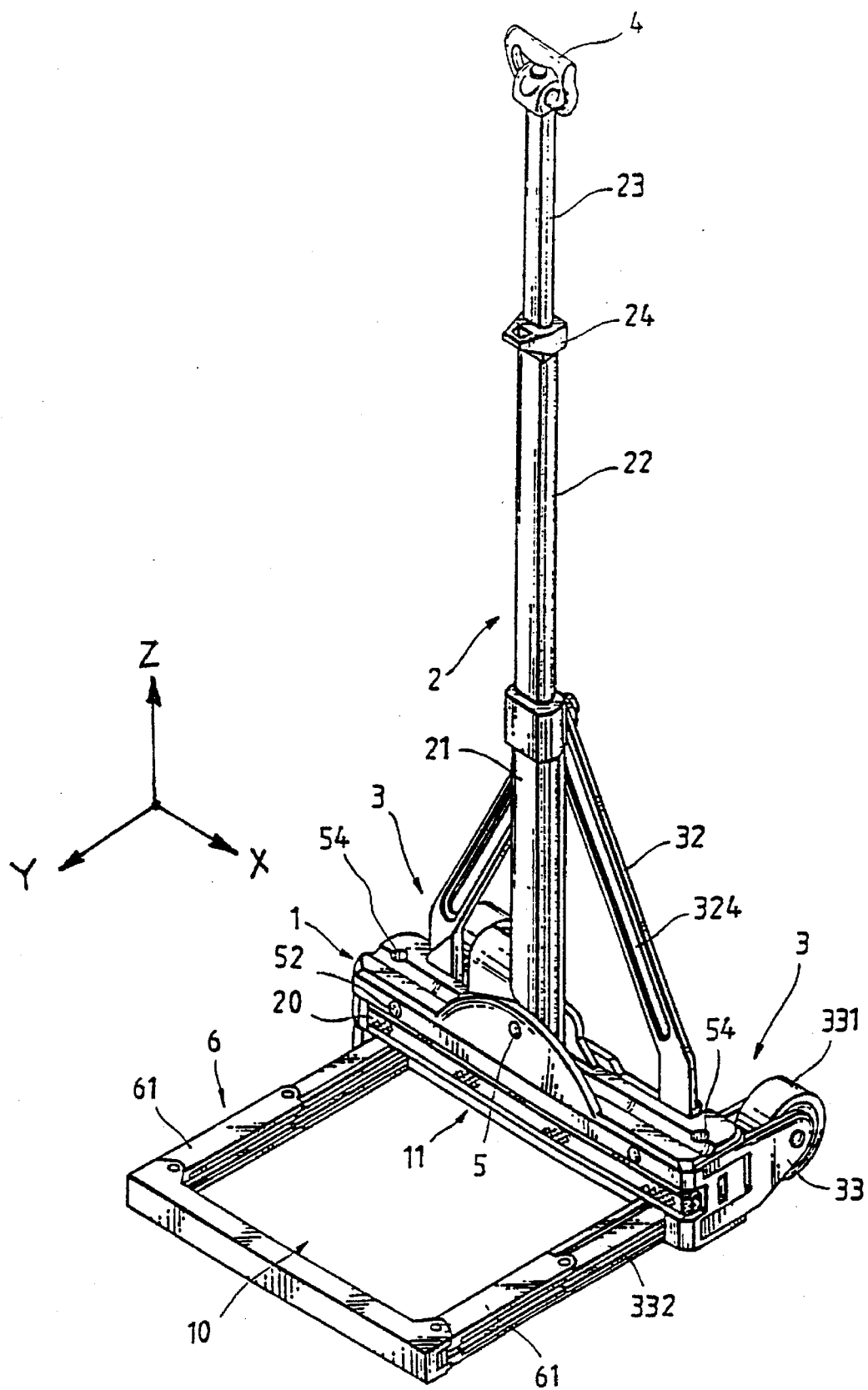
FIG. 1 is a perspective view of a collapsible hand cart according to the present invention.

Referring to FIG. 1, a collapsible hand cart in accordance with the present invention is generally comprised of a base frame unit 1, a driving mechanism 2, and two steering mechanisms 3.

Figure 4:
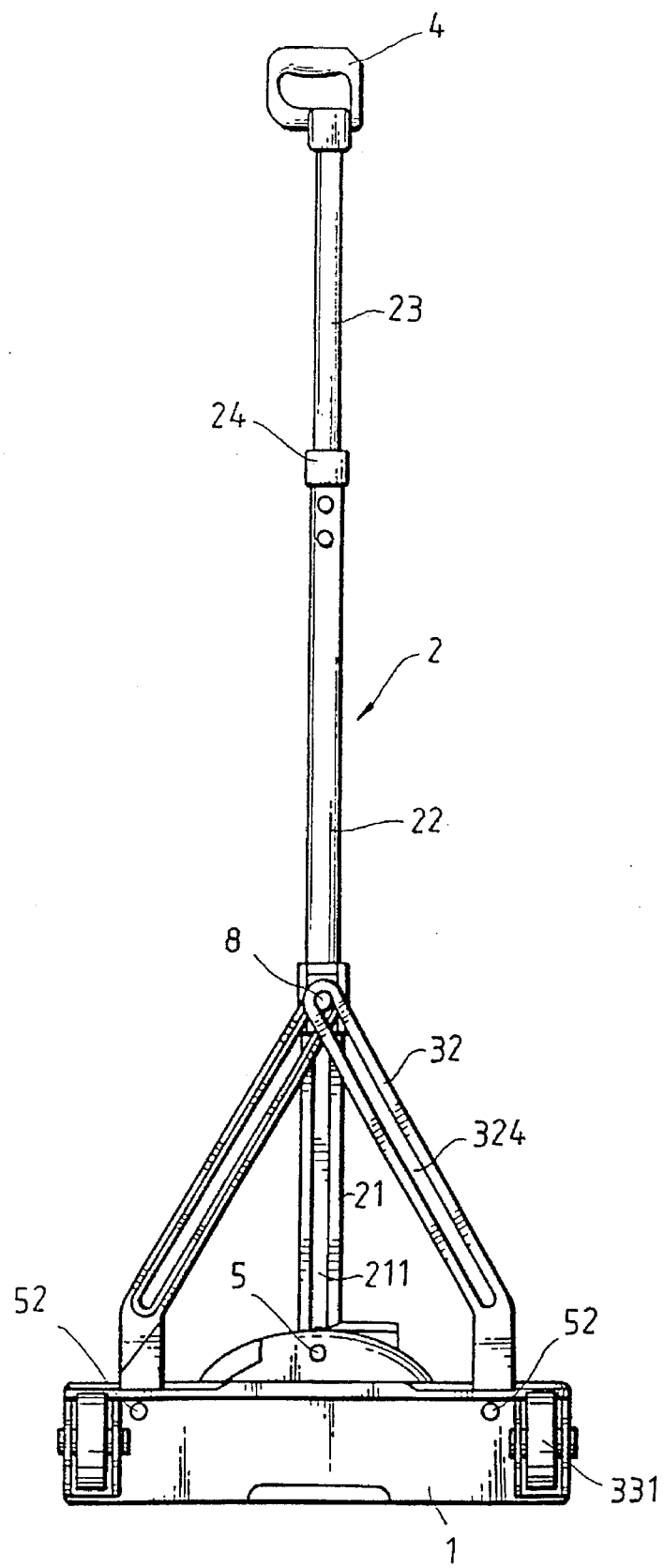
FIG. 4 is a rear elevational view of the collapsible hand cart when set in the operative position.

Referring to FIG. 4 and FIG. 1 again, the base frame unit 1 is made of substantially rectangular shape for supporting the driving mechanism 2. The driving mechanism 2 comprises a telescopic handle comprising of an outer tube 21, an intermediate tube 22, and an inner tube 23, and a handgrip 4 fixedly secured to the inner tube 23 at the top. The outer tube 21 comprises a longitudinal sliding slot 211, and a slide (not shown) moved along the longitudinal sliding slot 211. The intermediate tube 22 is relatively longer than the outer tube 21 and moved in and out of the outer tube 21, having a bottom end coupled to the slide and a top end extended out of the outer tube 21. The inner tube 23 is inserted in the intermediate tube 22, having a bottom end using a variety of means, which are known to the persons skilled in the art, to stay in the intermediate tube 22 for permitting the intermediate tube 22 to be pulled out of the outer tube 21 when the inner tube 23 is pulled out of the intermediate tube 22 but unable to disengage with the intermediate tube 22, and a top end fixedly connected to the handgrip 4.

Figure 2:
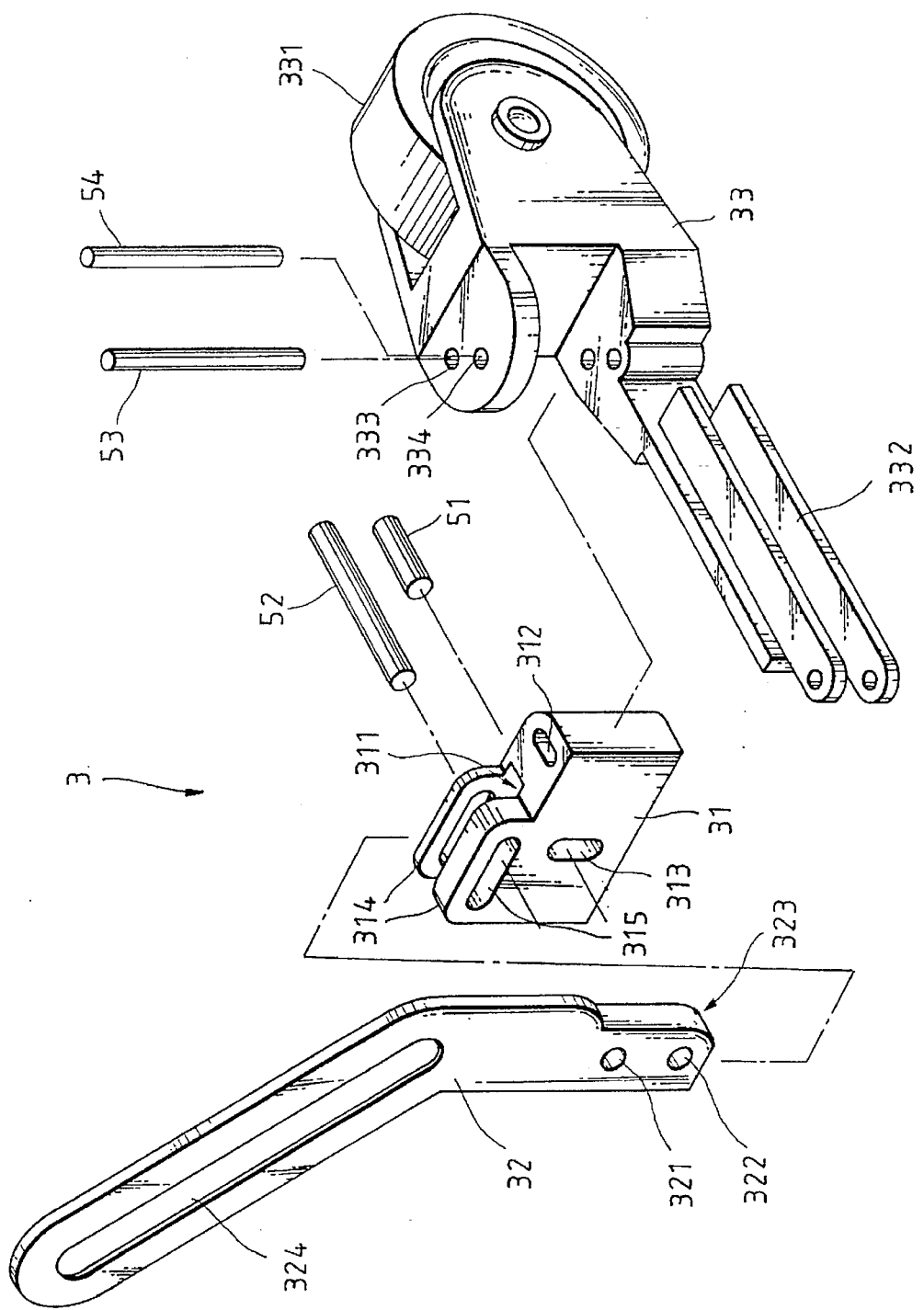
FIG. 2 is an exploded view of the steering mechanism of the collapsible hand cart shown in FIG. 1.

Referring to FIG. 2 and FIG. 1 again, the steering mechanism 3 comprises a movable member 31, a link 32, and a wheel holder 33. The movable member 31 is a solid block having an opening 311 at one end, a wheel holder mounting hole 312 vertically disposed at an opposite end for mounting the wheel holder 33, a longitudinal oblong slot 313 across the opening 311, two parallel upright lugs 314 at two opposite sides by the opening 311, each upright lug 314 defining a transverse oblong slot 315. The link 32 has two pivot holes 321, 322 vertically spaced near the bottom end thereof for coupling to the movable member 31, and an elongated sliding slot 324 at the top end thereof for coupling to the slide. The bottom edge 323 of the bottom end of the link 32 is smoothly chamfered. The wheel holder 33 is pivoted to the base frame unit 1 by pivot 54, having one end coupled with a roller 331 a pivot hole 333 in the middle for coupling the movable member 31 by pivot 53, and a front end terminating in two parallel extension bars 332 for coupling to one pivoted arm 61 of a U-frame 6. The U-frame 6 has two pivoted arms 61 respectively pivoted to the parallel extension bars 332 of the wheel holders 33 of the two steering mechanisms 3,and therefore the U-frame 6 and the extension bars 332 form a rectangular carrier frame 10. Because the two pivoted arms 61 of the U-frame 6 are respectively pivoted to the extension bars 332 of the wheel holders 33 of the two steering mechanisms 3, the rectangular carrier frame 10 is collapsed when the wheel holders 33 of the two steering mechanisms 3 are turned from the Y-axis direction to the X-axis direction (X-axis direction means the longitudinal direction of the base frame unit 1). When the wheel holders 33 of the two steering mechanisms 3 are moved to the Y-axis direction, the rollers 331 and the carrier frame 10 are disposed at two opposite sides relative to the base frame unit 1. There is also provided a lock device (not shown) for locking the wheel holders 33 in the Y-axis position.

Figure 3:
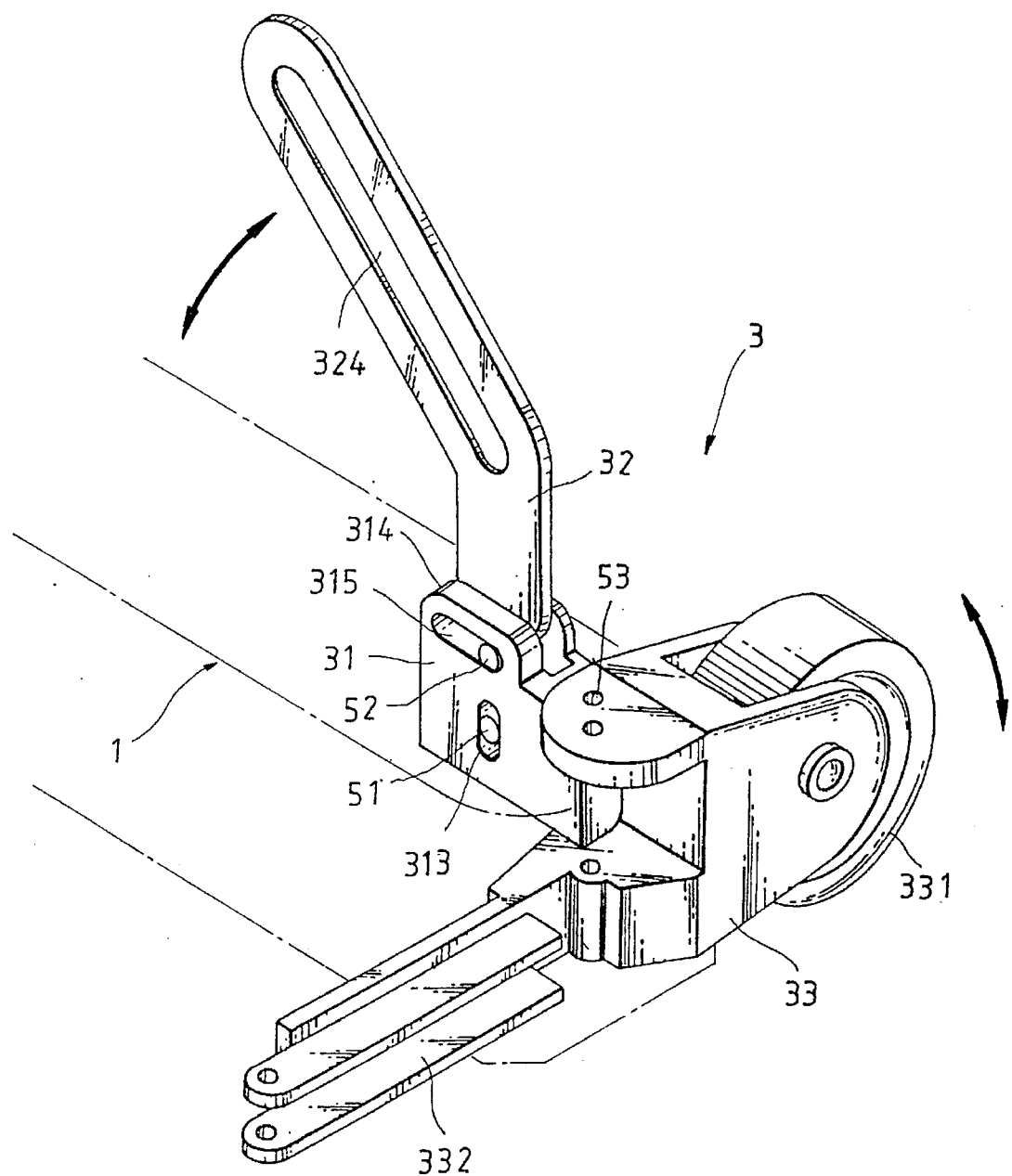
FIG. 3 is an assembly view of the steering mechanism shown in FIG. 2.

Referring to FIGS. 3 and 4, the movable members 31 of the two steering mechanisms 3 are mounted within the base frame unit 1 at two opposite sides. The bottom ends of the links 32 of the steering mechanism 3 are respectively inserted into the openings 311 of the movable members 31, and then the pivot holes 322, 321 of the links 32 are respectively connected to the longitudinal oblong slots 313 and transverse oblong slots 315 of the movable members 31 by a respective pivots 51, 52. When the links 32 are respectively and pivotably connected to the movable members 31, the movable members 31 are simultaneously and pivotably connected to the base frame unit 1 by the respective pivots 54. The elongated sliding slots 324 of the links 32 of the steering mechanisms 3 are respectively pivotably connected to the longitudinal sliding slot 211 on the outer tube 21 of the driving mechanism 2 by a bolt 8. After the installation of the links 32, the wheel holder mounting holes 312 of the movable members 31 are pivotably connected to the pivot holes 333 on the wheel holders 33 and respective pivot holes (not shown) on the base frame unit 1. When assembled, the movable members 31, the links 32, and the wheel holders 33 can be simultaneously moved.

Figure 5:
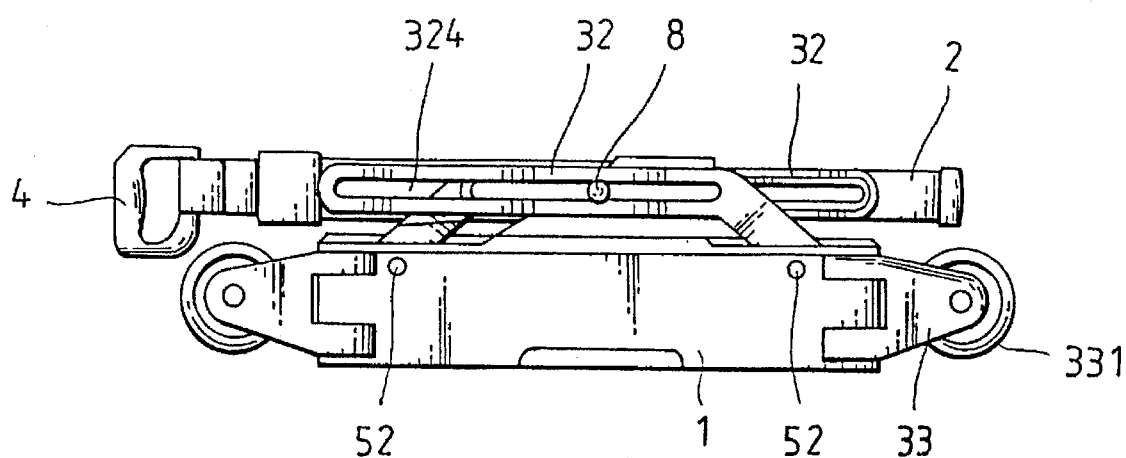
FIG. 5 shows the collapsible hand cart collapsed according to the present invention.

Referring to FIG. 5 and FIGS. 1 and 4 again, when the hand cart is collapsed, the wheel holders 33, movable members 31 and links 32 of the steering mechanism 3 and the tubes 21, 22 and 23 of the driving mechanism 2 are disposed in the X-axis, and the handgrip 4 is closely attached to the base frame unit 1. When in use, the handgrip 4 is pulled upwards to move the inner tube 23 out of the intermediate tube 22, the intermediate tube 22 will be carried out of the outer tube 21 by the inner tube 23 to move the slide upwards along the longitudinal sliding slot 211 on the outer tube 21, causing the slide to lift the links 32 in the Z-axis direction. When the links 32 are lifted, the wheel holders 33 are respectively moved to the Y-axis direction, causing the carrier frame 10 to move forwards from the base frame unit 1. When the links 32 are moved to the upper limit position at the top end of the longitudinal sliding slot 211, the wheel holders 33 are moved to the Y-axis direction, and the carrier frame 10 is fully extended out and set in the operative position for carrying things, which can be fastened to the carrier frame 10 by the elastic strap 20, which is connected to the base frame unit 1. When the aforesaid procedures are performed in the reverse order, the hand cart is collapsed.

Referring to FIGS. 2 and 3 again, because the links 32 and the movable members 31 are pivotably connected to the base frame unit 1 by the respective pivots 51, 52 which are inserted through the transverse oblong slots 315 on the upright lugs 314 of the movable members 31, when the links 32 are lifted in the Z-axis direction, the wheel holders 33 are turned about the respective pivots 54 and moved to the Y-axis direction, causing the U-frame 6 moved forwards from the base 11 of the base frame unit 1. By means of moving the driving mechanism 2 in the Z-axis direction, the steering mechanisms 3 are moved between the X-axis direction and the Y-axis direction, and therefore the hand cart can be extended out or collapsed.

It is to be understood that the drawings are designed for purposes of illustration only, and are not intended as a definition of the limits and scope of the invention disclosed.

I claim:

1. A collapsible hand cart comprising a base frame unit, a collapsible driving mechanism pivotally connected to said base frame unit and two steering mechanisms mounted on said base frame unit at two opposite sides for moving said base frame unit by said driving mechanism, wherein each steering mechanism comprises:

a wheel holder pivotally connected to said base frame unit, said wheel holder having a roller wheel thereon at one end for supporting and moving said base frame unit and an extension bar extending therefrom at an opposite end;

a movable member pivotally connected to said wheel holder, said movable member having an opening at one end, a first oblong slot and two parallel upright lugs at two opposite sides, each upright lug having a second oblong slot; and a link having a bottom end inserted into the opening in said movable member and pivotally connected to said movable member, and a top end connected to said driving mechanism through a slip joint, the bottom end of said link having two vertically spaced pivot holes respectively coupled to the first oblong slot on said movable member and to the second oblong slots on said upright lugs by pivot pins, the top end of said link having an elongated sliding slot connected to a slide vertically movable along a longitudinal sliding slot on said driving mechanism.

2. The collapsible hand cart of claim 1 wherein said driving mechanism comprises a telescopic handle comprising an outer tube, an intermediate tube, and an inner tube, and a handgrip fixedly secured to said inner tube, said outer tube pivotally connected to said base frame unit and having a longitudinal sliding slot and a slide connected to the elongated sliding slots of the links of said steering mechanisms and movable along the longitudinal sliding slot, said intermediate tube movable in and out of said outer tube and having a bottom end coupled to said slide and a top end extending out of said outer tube, said inner tube having a bottom end secured in said intermediate tube enabling said intermediate tube to be pulled out of said outer tube when said inner tube is pulled out of said intermediate tube, and a top end fixedly connected to said handgrip.

3. The collapsible hand cart of claim 1 further comprising a U-frame connected to the extension bars of the wheel holders of said steering mechanisms for carrying articles.

4. The collapsible hand cart of claim 3 wherein said U-frame comprises two pivoted arms respectively, each pivoted arm pivotally connected to an extension bar of the wheel holder of respective said steering mechanisms.

* * * * *